United States Patent

[11] 3,632,164

| [72] | Inventor | Arthur O. Radke |
| | | Milwaukee, Wis. |
| [21] | Appl. No. | 25,043 |
| [22] | Filed | Apr. 2, 1970 |
| [45] | Patented | Jan. 4, 1972 |
| [73] | Assignee | Universal Oil Products Company |
| | | Des Plaines, Ill. |

[54] VEHICLE SEAT HAVING AN IMPROVED SEAT COVER ATTACHMENT SYSTEM
9 Claims, 4 Drawing Figs.

[52] U.S. Cl. .................................................... 297/219, 297/452, 297/DIG. 1
[51] Int. Cl. ................................................................ A47c 31/02
[50] Field of Search ............................................ 297/DIG. 1, 452, 456, 455, 218, 219, 226, 458; 5/353.6, 353.7, 345, 353.1, 353.3

[56] References Cited
UNITED STATES PATENTS

| 2,468,558 | 4/1949 | Johnson | 5/345 R |
| 2,901,028 | 8/1959 | Bottemiller | 297/DIG. 1 |
| 3,049,730 | 8/1962 | Wall | 297/DIG. 1 |
| 3,068,495 | 12/1962 | Quakenbush | 5/353.7 |
| 3,233,253 | 2/1966 | Cauvin | 5/353.1 |
| 3,363,943 | 1/1968 | Getz et al. | 297/452 |
| 3,389,935 | 6/1968 | Getz et al. | 297/458 |
| 3,408,105 | 10/1968 | Portell | 297/219 |
| 3,529,866 | 9/1970 | Getz | 297/452 |

FOREIGN PATENTS

| 1,275,202 | 9/1961 | France | 297/DIG. 1 |

Primary Examiner—Francis K. Zugel
Attorneys—James R. Hoatson, Jr. and Philip T. Liggett ABSTRACT: In a vehicle seat, the improvement comprising a plurality of isolated anchor means embedded in a resilient foam cushion below the seating surface of the cushion. A seat cover is positioned in contact with the foam cushion and fastening means link the seat cover to each of the anchor means, thereby firmly attaching the seat cover to the foam cushion.

PATENTED JAN 4 1972
3,632,164
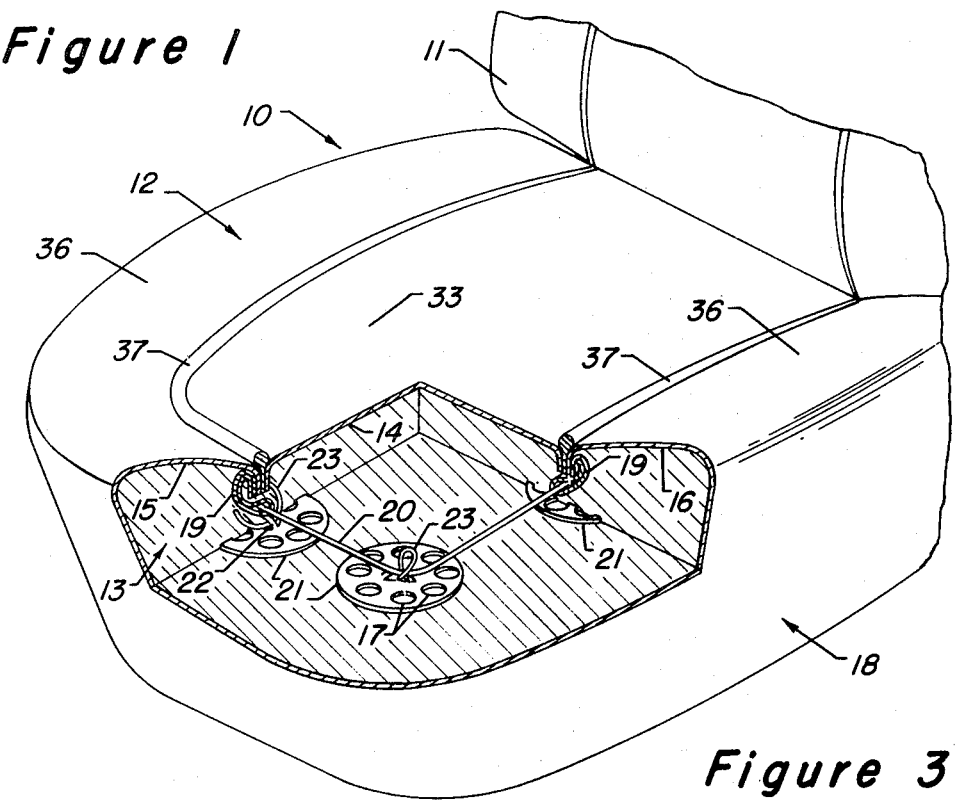
Figure 1
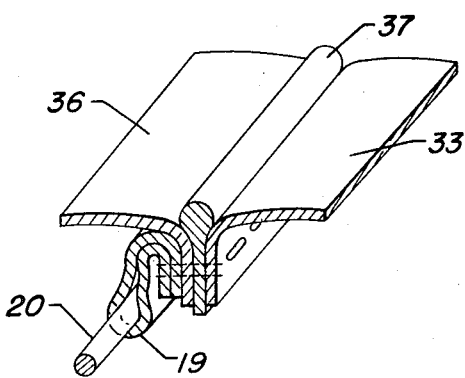
Figure 2
Figure 3
Figure 4
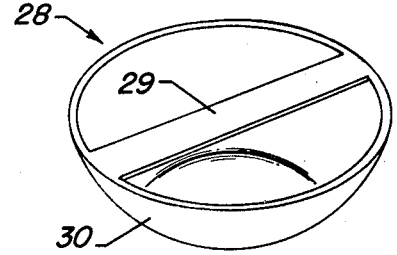
INVENTOR:
Arthur O. Radke
BY: James P. Hoatson Jr.
Philip T. Liggett
ATTORNEYS

VEHICLE SEAT HAVING AN IMPROVED SEAT COVER ATTACHMENT SYSTEM

This invention relates to an improved vehicle seat. More particularly, the improvement is comprised of a plurality of isolated anchor means embedded in a resilient foam cushion below the seating surface of the cushion. A seat cover is positioned in contact with the foam cushion and fastening means link the seat cover to each of the anchor means, thereby firmly attaching the seat cover to the foam cushion.

In the past, vehicle seat covers have been attached to seat cushions in a variety of ways. The simplest method is to attach the seat cover only to the underside of the seat cushion or to a frame positioned beneath the seat cushion. This arrangement is of limited use, however, in that the seat cover tends to sag and wrinkle unless the seat cushion has a convex seating surface, a configuration not particularly comfortable for a seat occupant.

Another manner of securing the seat cover to a foam cushion is to cement the seat cover to the cushion. A seat so designed is not very durable, however, because the adhesive bond often breaks due to the repeated flexing of the seat cushion. In addition, seat covers are frequently made of polyvinyl chloride, which, whether calendered, rotocast, or slush molded, contains plasticizers. These plasticizers tend to migrate over a period of time thereby degrading and destroying the bond. Also, the ketone-type solvents used in most of the adhesives attack the polyvinyl chloride. Another method of attachment involves embedding a wire, usually shaped to follow the seat contour, below the surface of a foam cushion. This wire is attached to the seat cover by using hog rings or other fastening means. The hog rings pierce a listing or flap sewn to the underside of the seat cover and encircle the wire embedded in the foam. This manner of attachment has heretofore required the embedded wire to be fastened to a seat frame in order to provide enough stability so that the seat cover may be firmly attached to the cushion. Unless the wire is attached to the seat frame, a secure attachment of the seat cover to the wire causes the wire to tear part way through the foam of the cushion. The result is a seat in which the seat cover sags and wrinkles, although the cover does follow the general contour of the foam cushion. Furthermore, the only practical manner of producing such a seat is by molding the seat cushion directly to the frame so as to embed in the foam cushion the wire which is fastened to the frame. This limits the available techniques in seat-manufacturing operations and reduces the number of seat designs which may be utilized.

Another manner of seat cover attachment is through the use of tiedowns. In this construction, wire clips or elastic bands are anchored to the seat cover and pass through the foam cushion and are attached to the underside of the seat cushion or to a frame adjacent to the underside of the seat cushion. The high assembly cost is the primary disadvantage of this manner of cover attachment. The special tools and extra parts required in assembling such a seat add further to the expense.

It is an object of this invention to incorporate anchoring or attachment means into the production of a cushion so that the anchor means are secured only by the foam cushion and are not directly attached to the vehicle cushion frame. Furthermore, each of the anchor means floats in isolation from each adjacent anchor means in the foam cushion. This manner of construction allows a foam cushion to be produced either in conjunction with or in the absence of a foamed-in frame. The construction of this invention is equally applicable and advantageous to either a vehicle seat cushion or a vehicle back cushion.

It is another object of this invention to incorporate anchor means into a cushion so that the anchor means are not easily pulled out of the cushion when the seat cover is attached thereto, but rather will remain embedded within the foam cushion and will resist upward forces exerted by the fastening means and thereby hold the seat cover in tight conformity to the seat cushion.

Yet another object of the invention is to fasten a seat cover to a foam cushion in a manner creating a uniform or well-defined contour. The contour is imparted to both the cushion and the seat cover by the surface curvature of the cushion. Still another object is to fasten the seat cover to a foam cushion rapidly and easily so as to reduce the cost of assembly. This is preferably accomplished using hog rings as the fastening means of this invention.

In a broad aspect this invention is, in a vehicle seat, the improvement comprising: a resilient foam seat or back cushion having an upper seating surface or other body support surface; a plurality of isolated floating anchor means embedded in said cushion below said upper seating surface or beneath said body support surface; a seat cover or cushion cover positioned in contact with said upper seating surface or body support surface; and fastening means linking said seat cover or said cushion cover to said anchor means, thereby firmly attaching said cover to said foam cushion.

The foam used to construct the seat cushion may be any conventional foam material, such as natural or synthetic rubber, flexible polyurethane foam, vinyl, or other resilient foam material. The seat of this invention is preferably produced so that each of the anchor means has an upper surface having a large horizontal component of area. Preferably, the upper surface of each anchor means is largely horizontal or is slightly concave upwards. The foam material above each anchor means having such a configuration provides substantial resistance to the upward forces on the anchor means caused by the fastening means used to attach the seat cover to the cushion. Each anchor means thereby remains embedded in the foam cushion and does not easily tear or knife through the foam material as is the case when each anchor means is convex upward or when the surfaces of contact between the upper surface of the anchor means and the foam cushion material are primarily vertical. One preferred manner of constructing the anchor means so as to maximize resistance to oppose upward forces is for each of the anchor means to be comprised of a perforated metal disk having a central attachment means. The perforated metal disk is positioned substantially parallel to the upper seating surface. Another form of anchor means which performs quite satisfactorily is a construction in which each anchor means is comprised of a wire formed in the shape of a circle divided into semicircles by a chord passing through the center of the circle.

In a preferred embodiment, this invention is, in a vehicle seat, the improvement comprising: a resilient foam seat cushion having a contoured upper seating surface generally delineated by a boundary into a seating portion and bolster portions to accommodate a seated occupant; a plurality of isolated floating anchor means embedded in said cushion at said boundary and below said upper seating surface; a seat cover having an underside in contact with said seating surface of said cushion; a wire fastened to the underside of said seat cover and following the aforesaid boundary; and fastening means connecting each of said anchor means to said wire, thereby holding said seat cover in contoured conformity with said upper seating surface. The wire fastened to the underside of the seat cover may be described as a border wire and may be constructed of any rigid material, but preferably is a steel wire, since steel is economical and is flexible enough to readily conform to the movement of the foam during the cushioning action of the seat.

The seat cover may be constructed of any conventional seat-covering material, such as natural or synthetic fabrics, polyvinyl chloride, or other plastics. Frequently, the seat cover is comprised of a plurality of separate sections of joined covering material.

In an alternative construction, the seat cover is comprised of a single expanse of seat-covering material. In either of these constructions, the border wire may be positioned in place in the sleeve while the sleeve is being formed or it may be inserted into the sleeve from either end after the sleeve is once constructed.

While the fastening means used to secure the wire and the anchor means together may be any conventional fastening means, such as loops of thread passing around the wire and hooked through or onto the anchor means, the fastening means used are preferably hog rings. Hog rings may be quickly and easily inserted through the foam and the sleeve to encircle the border wire and pass through or into the anchor means. The hog rings are inserted from above the cushion by folding back the edges of the seat cover above the bolster portions of the upper cushion surface. This exposes the sleeve at the boundary between the bolster portions and the seating portion of the upper seating surface. One prong of a hog ring is forced through the sleeve while the other prong is passed through a hole or opening in the attachment means of one of the anchor means so that the two prongs together bracket the wire and a portion of the anchor means. If the sleeve is constructed with intermittent gaps along its length through which the wire is visible, the hog rings need not pierce the sleeve but merely pass through the gaps in the sleeve between the underside of the seat cover and the border wire to fasten the wire to the anchor means. The anchor means may either be foamed entirely into the cushion or the cushion may be formed so as to leave an attachment portion or means of each of the anchor means exposed. A conventional tool for clamping hog rings is used to apply pressure on the outside of the prongs of the hog ring thereby forcing the ends of the prongs inward to overlap and fasten the wire to the anchor means. The points of the ends of the prongs either project toward the cushion or are buried in the cushion. After the insertion of all the hog rings, the edges of the seat cover are drawn back over the bolster portions to be fastened underneath the foam cushion. The hog rings used to fasten the border wire to the anchor means are thereby invisible from above the exposed surface of the seat cover.

The various features of this invention are more clearly illustrated in the accompanying drawings in which:

FIG. 1 is a perspective view in partial section of a preferred embodiment of this invention.

FIG. 2 is an isolated perspective view of the sleeve of the embodiment of FIG. 1.

FIG. 3 is an alternative embodiment of the anchor means of this invention.

FIG. 4 is another alternative embodiment of the anchor means of this invention.

Referring now to FIG. 1 there is shown a vehicle seat 10 comprised of a seat part 12 and a back part 11. Back part 11 may be of any conventional construction, but may be assumed to be of a construction similar to that of the seat part 12. The structural members of seat part 12 include a flexible polyurethane foam cushion 13 and a plain fabric or coated fabric seat cover 18 which envelops the foam cushion 13. The seat cover 18 is comprised of a plurality of sections of joined covering material. Included in seat cover 18 are peripheral sections 36, and central section 33. The outer edges of the peripheral sections 36 are tautly fastened together at the underside of the seat part 12. Alternatively, a frame could be foamed into the seat cushion 13 and the edges of the seat cover 18 would then be fastened onto the seat frame. For the purposes of illustration, however, the seat cushion 13 is assumed to rest on an exterior frame.

Seat cushion 13 is manufactured in a mold that is shaped to produce a contoured seat cushion. Seat cushion 13 has an upper surface contoured generally into a central seating portion 14 and side bolster portions 16 and a front bolster portion 15. The contour of seat cushion 13 is designed to accommodate a seated occupant. The bolster portions 16 and 15 of the seat cushion 13 are designed to add to the comfort of the seated occupant and to centrally position the occupant within the seat. At the demarcation between the central seating portion 14 and the bolster portions is a boundary or transition zone delineating the central portion from the bolster portions. The seat cushion 13 is molded with a groove in its upper surface at the boundary or transition zone between the central seating portion 14 and the bolster portions 15 and 16. The sleeve 19 and the sewn edges of central section 33, peripheral sections 36, and welting strip 37 fit into the groove and run along the front and sides of seating portion 14 at the boundary between seating portion 14 and bolster portions 15 and 16, but do not extend along the back edge of seat part 12. By accommodating sleeve 19, the groove in the cushion 13 prevents the occurrence of an uncomfortable ridge in the exposed surface of seat cover 18 due to the sleeve 19 and the border wire 20 encased therein.

Sleeve 19 is constructed to protrude from the underside of the seat cover 18 and to follow the demarcation between the seating portion 18 and the bolster portions of the upper surface of seat cushion 13 when the seat is assembled. That is, the sleeve 19 follows the boundary or transition zone between the central seating portion and the bolster portions of the seat cushion 13. The preferred manner of seat cover and sleeve construction is best illustrated in FIG. 2. To construct the sleeve 19, a strip of flexible material is positioned next to the underside of the seat cover to follow the boundary of the seating portion 14 of the upper cushion surface. The edges of the strip of flexible material are folded together to form a sleeve 19. The inner edges of the peripheral sections 36 of the material from which seat cover 18 is to be formed are positioned against the central section 33 so that the surface of central section 33 to be exposed is face to face with the surfaces of peripheral sections 36 which are to be exposed. A decorative welting strip may or may not be sandwiched between the central section 33 and the peripheral sections 36. The decorative welting strip 37 is included in the illustrations of FIGS. 1 and 2. The edges of all the adjacent materials are then aligned and sewn together and the peripheral sections 36 are then unfolded from the central section 33 of the seat cover 18 and are sewn together at their corners so as to form a contoured seat cover 18. Seat cover 18 is thereby formed with an exposed surface on one side and with sleeve 19 fastened to the underside. The border wire 20 is then forced into the sleeve 19 and is shaped to conform to the sleeve 19, which in turn conforms to the boundary or transition zone between the central seating portion 14 and the bolster portions 16 and 15 of seat cushion 13. The border wire 20 is a steel wire shaped in the form of three sides of a rectangle with the missing side being at the rear of seat part 12.

In assembling seat part 12, seat cover 18 is positioned with its central section 33 in contact with seating portion 14 of cushion 13. Sleeve 19, encompassing the border wire 20, is forced into the groove in the cushion 13. The peripheral sections 36 of seat cover 18 are folded back on top of the exposed surface of central section 33 of the seat cover 18, and hog rings 23 are used to attach the seat cover 18 to anchor means 21. A portion of the seat cover 18 and the seat cushion 13 is cut away in FIG. 1 so as to expose portions of two hog rings 23. These hog rings pierce the sleeve 19 and cushion 13, thereby entrapping the border wire 20, and pass through the aperture formed by the strap 22 in each of the anchor means 21, thereby securely connecting each of the anchor means 21 to the border wire 20. This connection holds the seat cover 18 in contoured conformity with the upper seating surface of the seat cushion 13. The hog rings 23 depicted are inserted and fastened by a conventional tool for such a purpose from above the bolster portions 15 and 16. The prongs of the hog rings 23 first pierce sleeve 19 so as to bracket the border wire 20. One of the prongs of each of the hog rings 23 is then passed through the aperture of the anchor means 21 formed by the strap 22. Pressure is then applied to the outsides of the prongs of each hog ring 23 by the aforesaid tool, thereby causing the prongs of each of the hog rings 23 to overlap and encircle the border wire 20 and the strap 22 of one of the anchor means 21. The insertion of other hog rings 23 is repeated intermittently along the length of wire 20. The seat cover 18 is thereby securely fastened to cushion 13 along the demarcation between the seating portion 14 and the bolster portions 15 and 16 of the upper surface of the seat cushion 13. The peripheral sections 36 of seat cover 18 are then brought over and around the bolster portions of the seat cushion 13 to beneath the seat.

The edges of the seat cover 18 are then fastened to each other or to an exterior frame in a standard manner.

In molding the seat cushion 13, the anchor means 21 are each supported within the mold by pedestals of polyurethane foam or other material, such as metallic pins so that they will occupy the correct position within seat cushion 13. Once the polyurethane foam formulation is introduced into the mold and the mold is closed, the polyurethane formulation foams and incorporates the polyurethane pedestals into the flexible foam polyurethane cushion 13. If metallic pins are used in place of polyurethane pedestals, they are not incorporated into the foam cushion 13 but instead leave small holes extending into cushion 13 thereby exposing or locating each of the anchor means 21. Each of the anchor means 21 is comprised of a floating perforated metal disk embedded in the cushion 13 at the boundary between the central seating portion 14 and the bolster portions 15 and 16. The perforated metal disk of each of the anchor means 21 is substantially parallel to the upper seating surface of the cushion 13. While exact parallel positioning of the anchor means is not critical, and indeed is impossible due to the contoured upper surface of the cushion 13, it is only important that the anchor means has an upper surface having a large horizontal component of area. In addition, it is also desirable for each anchor means to have one or more vertical apertures or perforations therethrough. This allows the polyurethane foam to form complete vertical connections through each anchor means so as to prevent lateral movement of each of the anchor means 21 within the foam cushion 13.

Each of the anchor means 21 is comprised of a flat disklike surface having an attachment means in the form of a strap 22 centrally positioned with respect to the perforated disk. This strap 22 is raised sufficiently so that the prongs of a hog ring 23 may pass laterally through the opening between the strap 22 and the remaining disklike portion of the anchor means 21. This construction allows the hog rings 23 to be securely fastened to the anchor means 21.

Two alternative constructions of the anchor means of this invention are illustrated in FIGS. 3 and 4. The anchor means 24 illustrated in FIG. 3 is comprised of a wire formed in the shape of a circle which is divided into two semicircles 26 and 25 by a chord passing through the center of the circle. The chord is comprised of one end 27 of the wire. In this embodiment, the prongs of the hog ring pass on either side of the end 27 of the wire. To link the seat cover 18 to each of the anchor means 21, the prongs are pressed together thereby trapping the end 27 of the wire in the loop formed by the closed prongs of a hog ring 23. The hog ring is thereby firmly secured to the anchor means which remains embedded in the foam cushion 13 despite the upward force resulting from the hog ring.

The anchor means 28 of FIG. 4 is comprised of a shallow metal bowl 30 having a contour slightly concave upward and having a bridge or strap 29 passing across the top of the bowl. The upward concavity and the large horizontal component of area of the upper surface of bowl 30 insure that bowl 30 will not knife or tear through the foam cushion 13. The strap 29 may be integrally formed with or welded or otherwise fastened to the bowl 30. Because bowl 30 is slightly concave, an aperture is formed between bowl 30 and strap 29 through which the prongs of a hog ring 23 may pass. A hog ring 23 can thereby be firmly secured to each of the anchor means 28.

Only a few of the embodiments of the anchor means have been illustrated, but the allowable form of the anchor means should not be limited to those embodiments depicted but should be construed to include an anchor means of any construction having a relatively large horizontal component of area and having an attachment means to which a hog ring or other fastening means may be attached.

The foregoing description and illustrations of the invention disclosed in this application are for purposes of illustration only, and no unnecessary limitations as to the scope of this invention should be construed therefrom as other modifications will be obvious to those skilled in the art of vehicle seating.

I claim as my invention:

1. In a vehicle seat, the improvement comprising:
   a. a resilient foam seat cushion having an upper seating surface,
   b. a plurality of isolated floating anchor members having dimensions perpendicular to the thickness thereof in a plane parallel to said seating surface which are much greater than the thickness of said members, said members being embedded in said cushion below said upper seating surface,
   c. a seat cover positioned in contact with said upper seating surface, and
   d. fastening means linking said seat cover to said anchor members, thereby firmly attaching said seat cover to said foam cushion.

2. The vehicle seat of claim 1 further characterized in that said upper seating surface of said cushion is contoured generally into a seating portion and bolster portions to accommodate a seated occupant.

3. The vehicle seat of claim 1 further characterized in that each of said anchor members has an upper surface having a large horizontal component of area.

4. The vehicle seat of claim 1 further characterized in that said anchor members are each comprised of a perforated metal disk positioned substantially parallel to said upper seating surface and having a central attachment means.

5. The vehicle seat of claim 1 further characterized in that said anchor members are each comprised of a wire formed in the shape of a circle divided into semicircles by a chord passing through the center of said circle.

6. The vehicle seat of claim 1 further characterized in that said fastening means are hog rings.

7. In a vehicle seat, the improvement comprising:
   a. a resilient foam seat cushion having a contoured upper seating surface generally delineated by a boundary into a seating portion and bolster portions to accommodate a seated occupant,
   b. a plurality of isolated floating anchor members having dimensions perpendicular to the thickness thereof in a plane parallel to said seating surface which are much greater than the thickness of said members, said members being embedded in said cushion at said boundary and below said upper seating surface,
   c. a seat cover having an underside in contact with said seating surface of said cushion,
   d. a wire fastened to the underside of said seat cover and following the aforesaid boundary, and
   e. fastening means connecting each of said anchor members to said wire thereby holding said seat cover in contoured conformity with said upper seating surface.

8. In a vehicle seat the improvement comprising:
   a. a resilient foam seat cushion having an upper surface contoured generally into a seating portion and bolster portions as delineated by a transition zone,
   b. a seat cover having an exposed surface and having an underside in contact with said upper cushion surface,
   c. a sleeve fastened to the underside of said seat cover to follow the transition zone of said seat cushion,
   d. an upper wire entrapped by said sleeve and following the transition zone of said seat cushion,
   e. a plurality of anchor members having dimensions perpendicular to the thickness thereof in a plane parallel to said seating surface which are much greater than the thickness of said members, said members being embedded in said transition zone of said foam cushion below said upper wire, and
   f. fastening means binding said anchor members and said upper wire together along the length of said upper wire.

9. In a vehicle seat, the improvement comprising:
   a. a resilient foam back cushion having a body support surface,
   b. a plurality of isolated floating anchor members having dimensions perpendicular to the thickness thereof in a plane parallel to said seating surface which are much greater than the thickness of said members, said members being embedded in said cushion beneath said body support surface, c. a cushion cover positioned in contact with said body support surface, and d. fastening means linking said cushion cover to said anchor members, thereby firmly attaching said cushion cover to said foam cushion.

* * * * *